United States Patent
Chang et al.

(10) Patent No.: US 12,217,394 B2
(45) Date of Patent: Feb. 4, 2025

(54) METHOD AND APPARATUS FOR MULTICOLOR UNMIXING THROUGH ITERATIVE MUTUAL-INFORMATION MINIMIZATION IN SIMULTANEOUS CHANNEL UPDATE STRUCTURE

(71) Applicant: Korea Advanced Institute of Science and Technology, Daejeon (KR)

(72) Inventors: JaeByum Chang, Daejeon (KR); Junyoung Seo, Daejeon (KR); Young-Gyu Yoon, Daejeon (KR); Hyunwoo Kim, Daejeon (KR); Jee Won Kim, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 549 days.

(21) Appl. No.: 17/567,300

(22) Filed: Jan. 3, 2022

(65) Prior Publication Data
US 2022/0215517 A1     Jul. 7, 2022

(30) Foreign Application Priority Data

Jan. 5, 2021 (KR) .................. 10-2021-0000688
Dec. 3, 2021 (KR) .................. 10-2021-0171431

(51) Int. Cl.
    *G06T 5/50*      (2006.01)
    *G01N 21/64*     (2006.01)
    (Continued)

(52) U.S. Cl.
    CPC ........... *G06T 5/50* (2013.01); *G01N 21/6428* (2013.01); *G01N 21/6456* (2013.01); *G06T 3/40* (2013.01);
    (Continued)

(58) Field of Classification Search
    CPC .... G06T 5/50; G06T 3/40; G06T 7/90; G06T 2207/10056; G06T 2207/10064;
    (Continued)

(56) References Cited

U.S. PATENT DOCUMENTS

| 5,834,203 A | * | 11/1998 | Katzir | ............... G01N 21/6458 |
|---|---|---|---|---|
| | | | | 252/582 |
| 2004/0161165 A1 | * | 8/2004 | Riley | ........................ G06T 5/50 |
| | | | | 382/294 |

(Continued)

FOREIGN PATENT DOCUMENTS

| EP | 3 961 194 A1 | 3/2022 |
|---|---|---|
| KR | 10-1629576 | 6/2016 |
| KR | 10-1847334 | 4/2018 |

OTHER PUBLICATIONS

European search opinion for EP22150031 dated Jun. 2, 2022. (Year: 2022).*

(Continued)

*Primary Examiner* — Juan A Torres
(74) *Attorney, Agent, or Firm* — BKRIP LLC (57) ABSTRACT

Methods and apparatuses for multicolor unmixing may involve iterative mutual information minimization in a simultaneous channel update structure. A plurality of images may be obtained with respect to a plurality of fluorophores labeled on different biomolecules, respectively. Images of the fluorophores may be unmixed from the obtained images, respectively, while simultaneously minimizing mutual information shared between the obtained images based on all permutation combinations of the obtained images. Signals having three or more fluorophores whose emission spectra are overlapped in one spectral range can be more accurately unmixed.

16 Claims, 8 Drawing Sheets

(51) Int. Cl.
  *G06T 3/40* (2006.01)
  *G06T 7/90* (2017.01)
(52) U.S. Cl.
  CPC ........ *G06T 7/90* (2017.01); *G01N 2021/6441* (2013.01); *G06T 2207/10056* (2013.01); *G06T 2207/10064* (2013.01); *G06T 2207/30004* (2013.01)
(58) Field of Classification Search
  CPC ......... G06T 2207/30004; G06T 7/0012; G06T 2207/20076; G06T 2207/30024; G01N 21/6428; G01N 21/6456; G01N 2021/6441; G01N 21/6458
  USPC ........................................................ 382/128
  See application file for complete search history.

(56) References Cited

U.S. PATENT DOCUMENTS

| | | |
|---|---|---|
| 2012/0057743 A1 | 3/2012 | Priore |
| 2016/0170197 A1 | 6/2016 | Kenny |
| 2017/0053397 A1* | 2/2017 | Chukka ................... G06F 18/23 |
| 2020/0249163 A1* | 8/2020 | Bierdz ............... G01N 21/6428 |
| 2020/0302603 A1* | 9/2020 | Barnes .................. G06T 7/0012 |
| 2021/0027462 A1* | 1/2021 | Bredno ................. G06T 7/0012 |
| 2021/0208076 A1* | 7/2021 | Chang ................ G01N 21/6456 |
| 2021/0334513 A1* | 10/2021 | Orth ................... G01N 21/6458 |
| 2022/0065788 A1* | 3/2022 | Chang ................ G01N 21/6428 |

OTHER PUBLICATIONS

Amendments received before examination for EP22150031 dated Dec. 19, 2022 (Year: 2022).*
Massoud Babaie-Zadeh, Christian Jutten. Mutual Information Minimization: Application to Blind Source Separation. Signal Processing, Elsevier, 2005, 85 (5), pp. 975-995. 10.1016 /j.sigpro.2004.11. 021. hal-00379405, 26 pp.
Ultra-multiplexed fluorescence imaging of biomolecules through single-round imaging and blind source unmixing, bioRxiv, Jan. 27, 2021 (Jan. 27, 2021), XP055904132, DOI: 10.1101/2021.01.27. 428247 Retrieved from the Internet: URL:https://www.biorxiv.org/content/10.110/2021.01.27.428247v1.full.pdf [retrieved on Mar. 22, 2022].
Anonymous: "Spectral Imaging and Linear Unmixing I MicroscopyU", Wayback Archive, Jul. 31, 2016 (Jul. 31, 2016), XP055924-054, ://www.microscopyu.com/techniques/confocal/spectral-imaging-and-linear-unmixing—Retrieved from the Internet: URL:https://web.archive.org/web/20160731140436/https://www.microscopyu.com/techniques/confocal/spectral-imaging-and-linear-unm xing [retrieved on May 23, 2022].
Xuesong Liu et al: "An Approach Based on Constrained Nonnegative Matrix Factorization to Unmix Hyperspectral Data", IEEE Transactions on Geoscience and Remote Sensing, IEEE, USA, vol. 49, No. 2, Feb. 2011 (Feb. 2011), pp. 757-772, XP011343709, ISSN: 0196-2892, DOI: 10.1109/TGRS.2010.2068053.

* cited by examiner

METHOD AND APPARATUS FOR MULTICOLOR UNMIXING THROUGH ITERATIVE MUTUAL-INFORMATION MINIMIZATION IN SIMULTANEOUS CHANNEL UPDATE STRUCTURE

CROSS-REFERENCES TO RELATED APPLICATIONS

This application is based on and claims priority under 35 U.S.C. 119 to Korean Patent Application Nos. 10-2021-0000688, filed on Jan. 5, 2021, and 10-2021-0171431, filed on Dec. 3, 2021 in the Korean intellectual property office, the disclosures of each of which are herein incorporated by reference in their entireties.

TECHNICAL FIELD

This disclosure relates to a method and apparatus for multicolor unmixing through iterative mutual-information minimization in a simultaneous channel update structure.

BACKGROUND OF THE DISCLOSURE

Recently, immuno-oncology for making an anti-cancer effect by activating immunocytes present within a patient cancer tissue has been in the spotlight. The immuno-oncology has a great difference in its anticancer effect depending on which immunocyte is present within a patient's cancer. In order to select an optimum anticancer drug for each patient or develop immuno-oncology having a new mechanism, it is necessary to simultaneously image various immune biomarkers within a patient's cancer. The existing several multiplexed imaging technologies are not widely used in the development of immuno-oncology, the discovery of a new biomarker, and the prediction of an immuno-oncology response due to several disadvantages, such as expensive special equipment required, a complicated process, a slow imaging speed, or sample damage during an imaging process. Accordingly, for optimum immuno-oncology recommendation for each patient and new immuno-oncology development, there is a need for a low-cost, high-efficiency and intactness multiplexed imaging technology.

SUMMARY

This summary is provided to introduce a selection of concepts in a simplified form that is further described below in the Detailed Description. This summary is not intended to identify key features of the claimed subject matter, nor is it intended to be used as an aid in determining the scope of the claimed subject matter.

Embodiments provide a method and apparatus for multicolor unmixing through iterative mutual information minimization in a simultaneous channel update structure.

An operating method of an electronic device according to an embodiment of the present disclosure may include obtaining a plurality of images with respect to a plurality of fluorophores labeled on different biomolecules, respectively; and unmixing images of the fluorophores from the obtained images, respectively, while simultaneously minimizing mutual information shared between the obtained images based on all permutation combinations of the obtained images.

An electronic device according to an embodiment of the present disclosure includes a memory and a processor connected to the memory and configured to execute at least one instruction stored in the memory. The processor may be configured to obtain a plurality of images with respect to a plurality of fluorophores labeled on different biomolecules, respectively, and to unmix images of the fluorophores from the obtained images, respectively, while simultaneously minimizing mutual information shared between the obtained images based on all permutation combinations of the obtained images.

A non-transitory computer-readable storage medium according to an embodiment of the present disclosure may store one or more programs for executing a method, including obtaining a plurality of images with respect to a plurality of fluorophores labeled on different biomolecules, respectively, and unmixing images of the fluorophores from the obtained images, respectively, while simultaneously minimizing mutual information shared between the obtained images based on all permutation combinations of the obtained images.

According to the present disclosure, image unmixing performance can be improved. In this case, in the present disclosure, signals having two or more fluorophores whose emission spectra overlap in one spectral range can be unmixed with higher accuracy. Specifically, in the present disclosure, images of respective fluorophores can be unmixed with higher accuracy based on only images obtained from the same number of detection spectral ranges as the number of fluorophores without measuring the emission spectrum of each of the fluorophores.

DESCRIPTION OF THE DRAWINGS

The foregoing aspects and many of the attendant advantages of the present disclosure will become more readily appreciated as the same become better understood by reference to the following detailed description, when taken in conjunction with the accompanying drawings, wherein.

DETAILED DESCRIPTION

While illustrative embodiments have been illustrated and described, it will be appreciated that various changes can be made therein without departing from the spirit and scope of the disclosure.

Hereinafter, embodiments of the present disclosure are described in detail with reference to the accompanying drawings so that a person having ordinary knowledge in the art to which the present disclosure pertains may easily practice the embodiments. However, the present disclosure may be implemented in various different forms and is not limited to the embodiments described herein. Furthermore, in the drawings, in order to clearly describe the present disclosure, a part not related to the description is omitted, and a similar reference number is used to refer to a similar part throughout the specification.

In this specification, when it is said that one part "includes" an element, the word "include" will be understood to imply the inclusion of stated parts, not the exclusion of other elements, unless explicitly described to the contrary. A term, such as a "~unit", a "~er (or ~or)" or a "module" used in the specification means a unit for processing at least one function or operation, and the unit may be implemented as hardware, software or a combination of hardware and software.

In the description, the subject of an operation may be omitted, but a method described in the present disclosure may be implemented in an electronic device, for example, a computing apparatus and an apparatus including a fluorescence microscope.

Fluorescence imaging is a scheme for labeling a biomolecule within a sample with various fluorophores, exciting the fluorophores by using light, and indirectly monitoring the biomolecules within the sample by detecting light emitted from each of the fluorophores through an optical microscope. The fluorophores have different excitation spectra and emission spectra due to their unique chemical structures. In this case, the fluorophore emits light having a longer wavelength than the absorbed light. In general, the excitation and emission spectrum of the fluorophores have a wide width of about 100 nm within a visible ray range (400 to 700 nm). In order to simultaneously detect several biomolecules within one sample, it is necessary to label the several biomolecules with different fluorophores and then selectively obtain an image of each fluorophore. To this end, fluorophores whose excitation spectra and emission spectra do not overlap need to be used. If four or more fluorophores are simultaneously used, signals of fluorophores cannot be accurately distinguished because an emission spectrum overlap occurs between the fluorophores due to a wide width of an emission spectrum. Accordingly, in general, a maximum of four biomolecules are detected by exciting only one fluorophore per standard excitation wavelength (405, 488, 560, 633 nm).

Recently, in the medical diagnosis and research field, the necessity to simultaneously image diverse biomolecules in one sample is increased. However, the existing fluorescence microscope has limitations in that only a maximum of four fluorophores can be simultaneously used at a time. In order to overcome such limitations, various technologies have been developed. The technologies may be basically divided into three types.

First, in a multi-round staining technique, after biomolecules within a sample are labeled and imaged using three or four fluorophores whose emission spectra do not overlap, the fluorophores are deactivated through chemical treatment or are detached from the biomolecules. Thereafter, other biomolecules are labeled and imaged using three or four identical fluorophores. If such a method is iterated, several tens of biomolecules can be simultaneously observed in one biological sample. However, a long time is taken and it is inconvenient to register images obtained in the iterated process because the process of labeling and deactivating fluorophores has to be iterated. Furthermore, a distribution of multiple molecules cannot be obtained in a three-dimensional way due to the registration problem. Furthermore, there is a problem in that a sample is damaged during a chemical treatment process.

Second, in spectral imaging and linear unmixing, biomolecules are labeled using several fluorophores whose emission spectra overlap and the fluorophores are simultaneously excited. Thereafter, after an image of a sample is obtained from several detection wavelength bands, the obtained image is unmixed into an image of only each fluorophore based on information on the relative intensity of each fluorophore for each wavelength band. If the information on the emission spectrum of each fluorophore that has been labeled with various biomolecules is known, images of respective fluorophores can be unmixed based on the emission intensities of the fluorophore for each wavelength. However, in order to accurately calibrate the emission spectrum of the fluorophore, expensive and special equipment called a spectral detector is necessary. Furthermore, the intensity of each fluorophore for each wavelength is different depending on an optical characteristic within a microscope, the sensitivity of a camera for each wavelength, the chemical composition of a sample, etc. Furthermore, the emission spectrum of a fluorophore is different depending on the type of tissue, subregion of tissue and imaging depth. Accordingly, spectral imaging and linear unmixing is not widely used in tissue imaging because the emission spectrum of each fluorophore needs to be separately measured every time every microscope and every sample.

Third, blind unmixing is a method of unmixing fluorophore signals in the state in which an emission spectrum of a fluorophore is unknown. To this end, independent component analysis (ICA) or non-negative matrix factorization (NMF) has been used. However, the independent component analysis (ICA) method and the non-negative matrix factorization (NMF) method are very limitedly used due to the low accuracy of signal unmixing because millions of elements have to be precisely analogized simultaneously. For example, in order to unmix three fluorophore signals whose emission spectra overlap, 3,145,728 (=3×1024×1024) or more elements have to be simultaneously analogized (1024× 1024 resolution reference). Furthermore, the existing ICA or NMF has a condition in that the number of images necessary for unmixing must be greater than the number of fluorophores. That is, the two methods have a disadvantage in that a long time is taken because nine or more sheets of images need to be obtained in order to simultaneously image eight fluorophores.

Conclusionally, it is difficult to substantially use the existing multiplexed imaging techniques for research and diagnosis due to problems, such as inconvenience and complexity of an experiment process and an imaging process, inaccuracy of signal unmixing, and requirements for special equipment, so that the existing multiplexed imaging techniques are not widely used. In order to solve such problems, a new blind multiplexed imaging technique (Process of ultra-multiplexed Imaging of biomoleCules Via the unmixing of the Signals of Spectrally Overlapping fluorophores (PICASSO)) was recently developed. PICASSO is based on the principle that signal unmixing is performed on images in which signals of fluorophores are mixed through mutual information minimization.

In the first developed PICASSO v1.0, through mutual information minimization between an image 1 including only a signal of a fluorophore 1 and an image 2 including both signals of fluorophores 1 and 2, 10 markers can be simultaneously imaged. PICASSO v2.0 improved from PICASSO v1.0 has advantages in that a signal to noise ratio is higher and an additional signal amplification process is not necessary compared to PICASSO v1.0 because signal unmixing is possible although both the signals of the fluorophores 1 and 2 are included in the image 1 through iterative mutual information minimization. However, since both PICASSO v1.0 and v2.0 enable signal unmixing for only two markers per excitation laser (e.g., two for each of five standard excitation lasers of 405, 488, 560, 640, and 730 nm), it is difficult to simultaneously monitor 10 markers or more.

Accordingly, PICASSO v3.0 improved from PICASSO v1.0 and v2.0 was developed. In PICASSO v3.0, the multiplexing capability of PICASSO v1.0 and v2.0 was improved twice or more. PICASSO v3.0 is a technology capable of unmixing signals of three or more fluorophores whose emission spectra overlap by using only images obtained from the same number of detection spectral ranges as the number of fluorophores without a separate fluorophore emission spectrum measurement. In PICASSO v3.0, if each detection spectral range is designed to include a peak of an emission spectrum of each fluorophore, it is guaranteed that a signal of another fluorophore is preferentially removed compared to a signal of the fluorophore having a high point in the corresponding spectral range. Accordingly, PICASSO v3.0 has the multiplexing capability more than twice over PICASSO v1.0 and v2.0 because signal unmixing is possible between three or more fluorophores by using one laser. However, according to PICASSO v3.0, as the number of images on which signal unmixing needs to be performed is increased from two to three or more, complexity and difficulty thereof are increased. Furthermore, since signal unmixing between several images is sequentially performed, the accuracy of results is affected depending on an order of the unmixing. As a result, there is a disadvantage in that the accuracy of signal unmixing is reduced as the number of images on which signal unmixing needs to be performed is increased.

Hereinafter, the present disclosure proposes PICASSO v4.0 improved from PICASSO v3.0. PICASSO v4.0 proposes a simultaneous channel update algorithm instead of a sequential channel update algorithm in order to increase the accuracy of signal unmixing.

Figure 1:
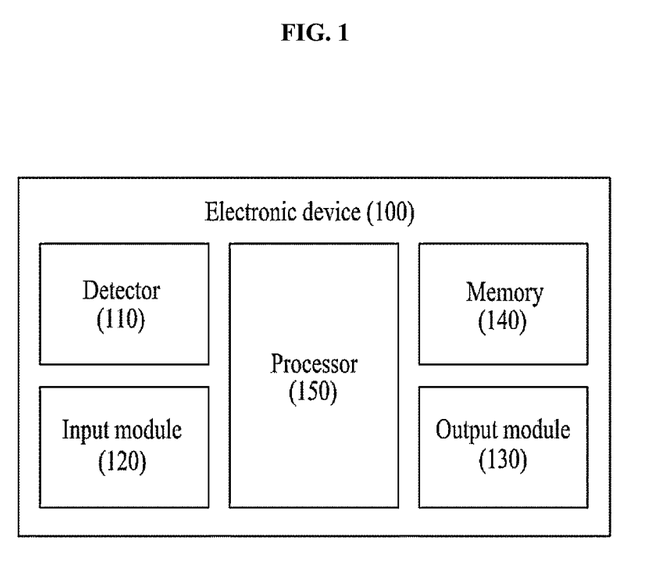
FIG. 1 is a block diagram of an electronic device according to various embodiments of the present disclosure.
Figure 2:
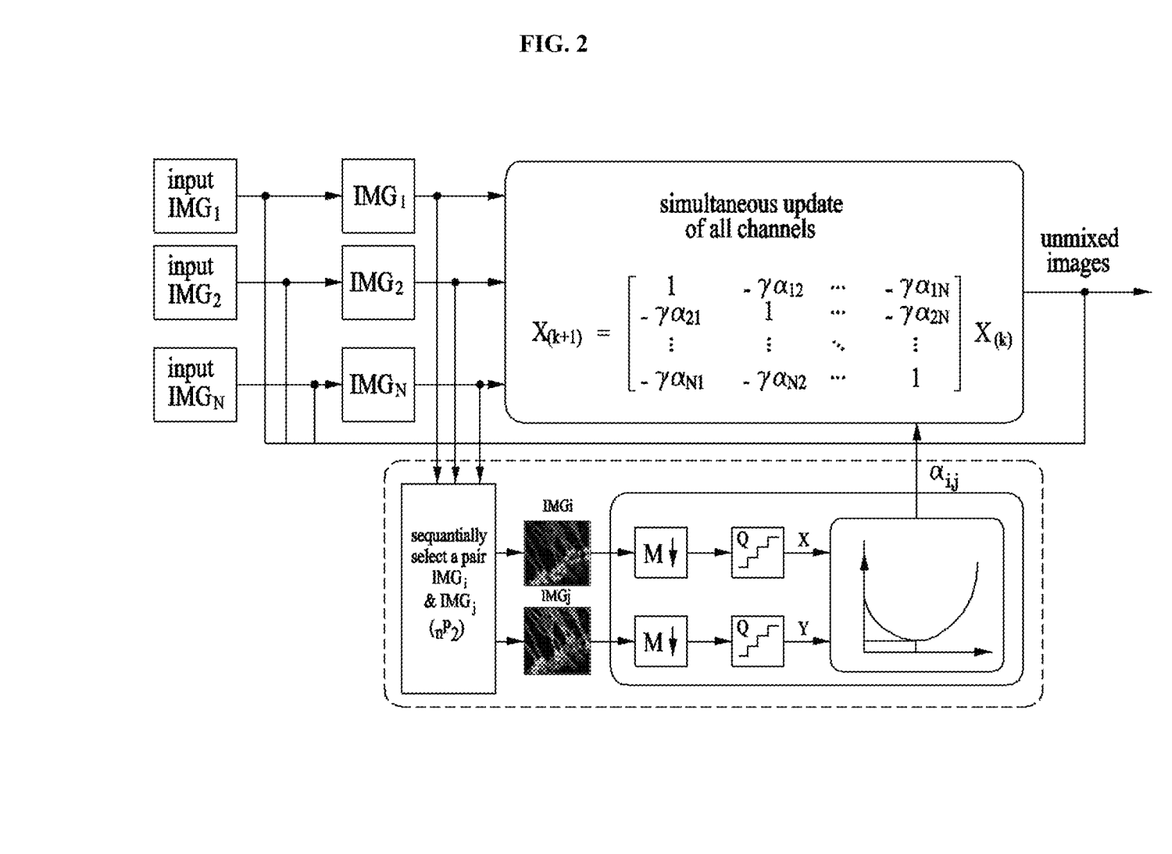
FIG. 2 is a schematic diagram for describing an operating principle of the electronic device according to various embodiments of the present disclosure.

FIG. 1 is a block diagram of an electronic device 100 according to various embodiments of the present disclosure. FIG. 2 is a schematic diagram for describing an operating principle of the electronic device 100 according to various embodiments of the present disclosure.

Referring to FIG. 1, the electronic device 100 according to various embodiments of the present disclosure may include at least any one of a detector 110, an input module 120, an output module 130, a memory 140 or a processor 150. In embodiments, at least any one of the components of the electronic device 100 may be omitted, or one or more other components may be added to the electronic device 100.

The detector 110 may photograph an image of a sample. In this case, the detector 110 may be installed at a predetermined location of the electronic device 100, and may photograph the image. For example, the detector 110 may include at least any one of a scientific complementary metal-oxide-semiconductor (sCMOS) camera, a photomultiplier tube (PMT), or equipment capable of measuring the intensity of light and representing the intensity as an image.

The input module 120 may receive, from the outside of the electronic device 100, an instruction or data to be used in at least any one of the elements of the electronic device 100. In this case, the input module 120 may include at least any one of an input device or a reception device. For example, the input device may include at least any one of a microphone, a mouse or a keyboard. In an embodiment, the input device may include at least any one of touch circuitry configured to detect a touch or sensor circuitry configured to measure the intensity of a force generated by touch. The reception device may include at least any one of a wireless reception device or a wired reception device.

The output module 130 may provide information to the outside of the electronic device 100. In this case, the output module 130 may include at least any one of a display device or a transmission device. For example, the display device may include at least any one of a display, a hologram device, or a projector. In an embodiment, the display device may be implemented as a touch screen by being assembled with at least any one of the touch circuitry or sensor circuitry of the input module 120. The transmission device may include at least any one of a wireless transmission device or a wired transmission device.

According to an embodiment, the reception device and the transmission device may be integrated into one communication module. The communication module may support communication between the electronic device 100 and an external device (not illustrated). The communication module may include at least any one of a wireless communication module or a wired communication module. In this case, the wireless communication module may consist of any one of a wireless reception device or a wireless transmission device. Furthermore, the wireless communication module may support at least any one of a long-distance communication method or a short-distance communication method. The short-distance communication method may include at least any one of Bluetooth, Wi-Fi direct, or infrared data association (IrDA), for example. The wireless communication module may perform communication over a network by using a long-distance communication method. The network may include at least any one of a cellular network, the Internet, or a computer network such as a local area network (LAN) or a wide area network (WAN), for example. The wired communication module may consist of at least any one of a wired reception device or a wired transmission device.

The memory 140 may store at least any one of a program or data used by at least any one of the components of the electronic device 100. For example, the memory 140 may include at least any one of a volatile memory or a nonvolatile memory.

The processor 150 may control at least any one of the components of the electronic device 100 by executing a program of the memory 140, and may perform data processing or an operation. The processor 150 may obtain a plurality of images, for example, N images with respect to a plurality of fluorophores, for example, N fluorophores labeled on different biomolecules, respectively. In this case, the processor 150 may obtain the plurality of images in different detection spectral ranges distinguished from one another. Emission spectra of at least two of the fluorophores may overlap in each of the detection spectral ranges. In this case, N may be a number equal to or greater than 2. In other words, the processor 150 may obtain two or more images of two or more fluorophores. Furthermore, the processor 150 may unmix images of the fluorophores from the obtained images, respectively, while minimizing mutual information shared between the obtained images based on all permutation combinations of the obtained images. In this case, the processor 150 may minimize mutual information shared with others of the obtained images with respect to each of the obtained images.

For example, if N images ($IMG_N$) are obtained from different detection spectral ranges by exciting N spectrally overlapping fluorophores through one laser, as in [Equation 1] below, images ($F_N$) of N types of fluorophores are linearly added and appear in each image ($IMG_N$).

$$\begin{bmatrix} IMG_1 \\ IMG_2 \\ \vdots \\ IMG_N \end{bmatrix} = \begin{bmatrix} 1 & \alpha_{12} & \cdots & \alpha_{1,N} \\ \alpha_{2,1} & 1 & \ddots & \vdots \\ \vdots & \ddots & \ddots & \alpha_{N-1,N} \\ \alpha_{N,1} & \cdots & \alpha_{N,N-1} & 1 \end{bmatrix} \begin{bmatrix} F_1 \\ F_2 \\ \vdots \\ F_N \end{bmatrix} \quad \text{[Equation 1]}$$

wherein a coefficient ($\alpha_{i,j}$) where images of several fluorophores are linearly added is different for each image. If it is guaranteed that a peak of an emission spectrum of one fluorophore is included in each detection spectral range and an operation of linearly subtracting other remaining (N−1) images from the image is performed, it is guarantee that a signal of another fluorophore is preferentially removed compared to a fluorophore having a peak in a corresponding range. In this case, mutual information minimization is used. The mutual information is a value derived from an information theory. Mutual information between two variables means a total amount of information shared by the two variables. Accordingly, mutual information between two random variables is 0. Since a digital image is a discrete variable, mutual information between two images is calculated using [Equation 2] below. In [Equation 2], $p_X(x)$ and $p_Y(y)$ correspond to probability distribution functions (or histograms) of images, respectively. $p_{(X,Y)}(x,y)$ corresponds to a combined probability distribution function (or combination histogram) of the two images.

$$I(X;Y) = \sum_y \sum_x p_{(X,Y)}(x,y) \log\left(\frac{p_{(X,Y)}(x,y)}{p_X(x)p_Y(y)}\right) \quad \text{[Equation 2]}$$

The processor 150 may minimize mutual information of the two images as follows.

First, in step i-1), the processor 150 may initialize variables as in [Equation 3] below for iterative mutual information minimization. In [Equation 3], u1 and u2 may indicate input images, v1 and v2 may indicate low-resolution images, and m may be defined as a factor applied in order to process the input images as the low-resolution images, respectively. For example, pixelBinning(u1, m) is a process of obtaining an image having m-times lower resolution by adding (or averaging) values of adjacent m×m pixels within an input image (u1), and it is used to increase an operation speed and robustness to noise and may be omitted by setting m=1 or substituted with another image down-sampling method.

$$u1 = IMG_i$$
$$u2 = IMG_j$$
$$v1 = \text{pixelBinning}(u1, m)$$
$$v2 = \text{pixelBinning}(u2, m) \quad \text{[Equation 3]}$$

Furthermore, in step i-2), the processor 150 may define the first loss function as in [Equation 4] below, and may calculate $\hat{\alpha}$ that minimizes the first loss function as in [Equation 5] below. Thereafter, in step i-3), the processor 150 may update the values of u1 and v1 as in [Equation 6] below by using $\hat{\alpha}$ that minimizes the first loss function. In this case, in order to achieve more accurate image unmixing by adjusting the speed at which an image is unmixed, $\hat{\alpha}\gamma$ obtained by multiplying $\hat{\alpha}$ by $\gamma$, that is, a positive number smaller than 1, may be used instead of $\hat{\alpha}$ in [Equation 6].

$$L_1(\alpha) = I(v1 - \alpha \times v2; v2) \quad \text{[Equation 4]}$$

$$\hat{\alpha} = \arg\min_\alpha L_1(\alpha) = \arg\min_\alpha I(v1 - \alpha \times v2; v2) \quad \text{[Equation 5]}$$

$$u1' = u1 - \hat{\alpha}u2$$

$$v1' = \text{pixelBinning}(u1, m) \quad \text{[Equation 6]}$$

Furthermore, in step i-4), the processor 150 may define the second loss function as in [Equation 7] below, and may calculate $\hat{\beta}$ that minimizes the second loss function as in [Equation 8] below. Thereafter, in step i-5), the processor 150 may update the values of u2 and v2 as in [Equation 9] below by using $\hat{\beta}$ that minimizes the second loss function. In this case, in order to achieve more accurate image unmixing by adjusting the speed at which an image is unmixed, $\hat{\beta}\gamma$ obtained by multiplying $\hat{\beta}$ by $\gamma$, that is, a positive number smaller than 1, may be used instead of $\hat{\beta}$ in [Equation 9].

$$L_2(\beta) = I(v1; v2 - \beta \times v1) \quad \text{[Equation 7]}$$

$$\hat{\beta} = \arg\min_\beta L_2(\beta) = \arg\min_\beta I(v1; v2 - \beta \times v1) \quad \text{[Equation 8]}$$

$$u2' = u2 - \hat{\beta}u1_{-1}$$
$$v2' = \text{pixelBinning}(u2, m) \quad \text{[Equation 9]}$$

In step i-6), the processor 150 may iteratively perform i-2) to i-5) on obtained u1', u2', v1', and v2' N times or until mutual information is equal to or smaller than a reference value. Accordingly, in step i-7), the processor 150 may obtain the final solution as in [Equation 10] below by imposing positive number restrictions on a solution obtained through the iterative operation. A resulting product may correspond to unmixed images having minimized mutual information.

$$u1 = \max(u1, 0)$$

$$u2 = \max(u2, 0) \quad \text{[Equation 10]}$$

The processor 150 may minimize mutual information of N images as follows.

First, in step ii-1), the processor 150 may select two images of the N images. Thereafter, in step ii-2), the processor 150 may initialize variables as in [Equation 11] below for simultaneous channel mutual information minimization. In [Equation 11], u1 and u2 may indicate input images, v1 and v2 may indicate low-resolution images, and m may be defined as a factor applied to process the input images as the low-resolution images, respectively. For example, pixelBinning($IMG_i$, m) is a process of obtaining an image having m-times lower resolution by adding (or averaging) values of adjacent m×m pixels within an input image ($IMG_i$), and it is used to increase an operation speed and robustness to noise and may be omitted by setting m=1 or substituted with another image down-sampling method.

$$u1 = IMG_i$$

$$u2 = IMG_j$$

$$v1 = \text{pixelBinning}(u1, m)$$

$$v2 = \text{pixelBinning}(u2, m) \quad \text{[Equation 11]}$$

Furthermore, in step ii-3), the processor 150 may define a loss function as in [Equation 12], and may calculate $\widehat{\alpha_{i,j}}$ that minimizes the loss function as in [Equation 13].

$$L(\alpha) = I(v1; v2 - \alpha \times v1) \quad \text{[Equation 12]}$$

$$\widehat{\alpha_{i,j}} = \arg\min_{\alpha} L(\alpha) = \arg\min_{\alpha} I(v1; v2 - \alpha \times v1) \quad \text{[Equation 13]}$$

Furthermore, in step ii-4), the processor 150 may update [Equation 14] by iterating step ii-2) to step ii-3) based on all possible permutation combinations ($_N P_2$) among the N images. In [Equation 14], k may indicate an iteration number, γ may indicate an update ratio, and $X_{i(k+1)}$ may indicate an i-th channel image after a k-th iteration.

$$\begin{bmatrix} X_{1(k+1)} \\ X_{2(k+1)} \\ \vdots \\ X_{N(k+1)} \end{bmatrix} = \begin{bmatrix} 1 & -\gamma\hat{\alpha}_{1,2(k)} & \cdots & -\gamma\hat{\alpha}_{1,N(k)} \\ -\gamma\hat{\alpha}_{2,1(k)} & 1 & \ddots & \vdots \\ \vdots & \ddots & \ddots & -\gamma\hat{\alpha}_{N-1,N(k)} \\ -\gamma\hat{\alpha}_{N,1(k)} & \cdots & -\gamma\hat{\alpha}_{N,N-1(k)} & 1 \end{bmatrix} \begin{bmatrix} X_{1(k)} \\ X_{2(k)} \\ \vdots \\ X_{N(k)} \end{bmatrix} \quad \text{[Equation 14]}$$

In step ii-5), the processor 150 may iteratively perform step ii-1) to step ii-4) k times or until mutual information is equal to or smaller than a reference value. In this case, $X_i(k+1)$ obtained in a previous step is used as an input image, that is, $IMG_i$.

Accordingly, in step ii-6), the processor 150 may obtain the final solution as in [Equation 15] below by imposing positive number restrictions on a solution obtained through the iterative operation. A resulting product may correspond to an unmixed image having minimized mutual information.

$$X_{i,k} = \max(X_{i,k}, 0) \quad \text{[Equation 15]}$$

Figure 3:
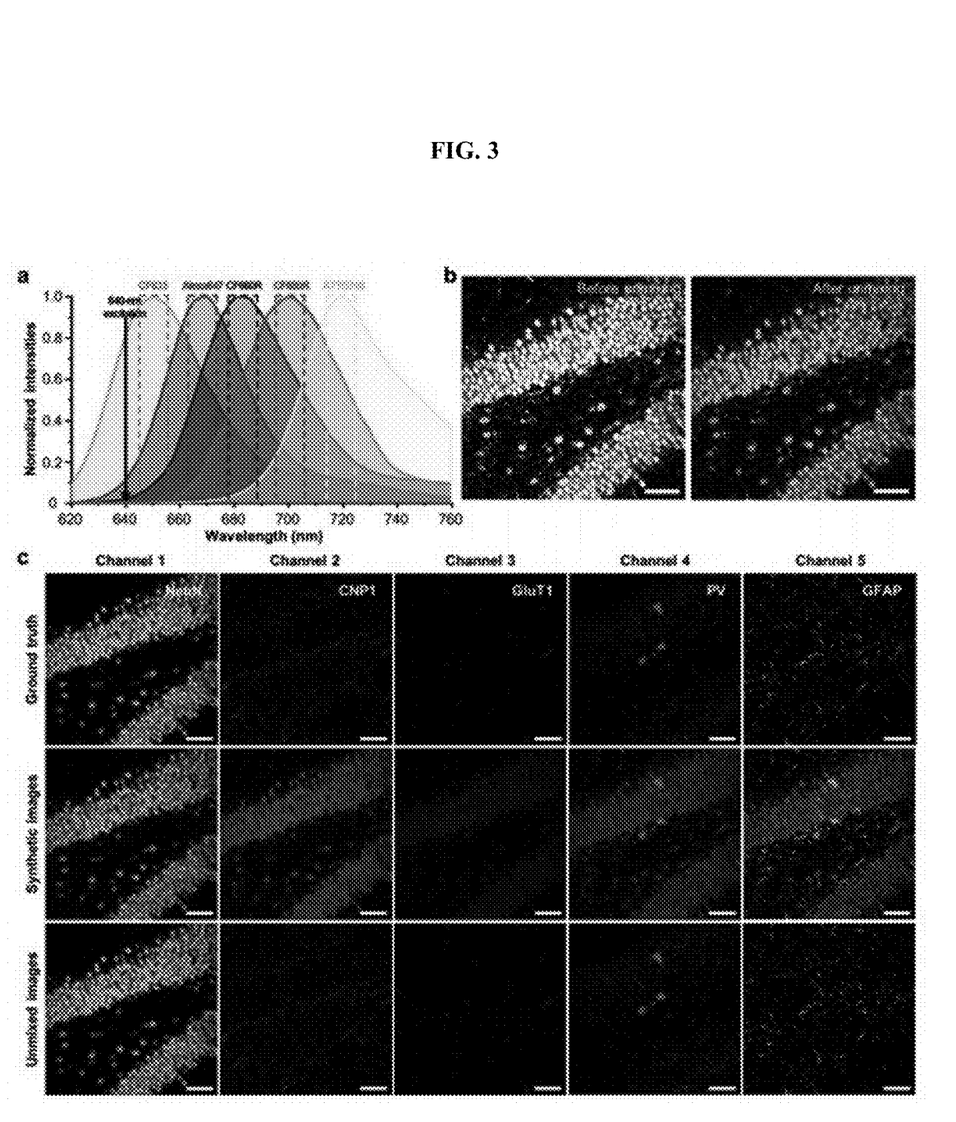
FIGS. 3 and 4 are exemplary diagrams for describing operation examples of the electronic device according to various embodiments of the present disclosure.
Figure 4:
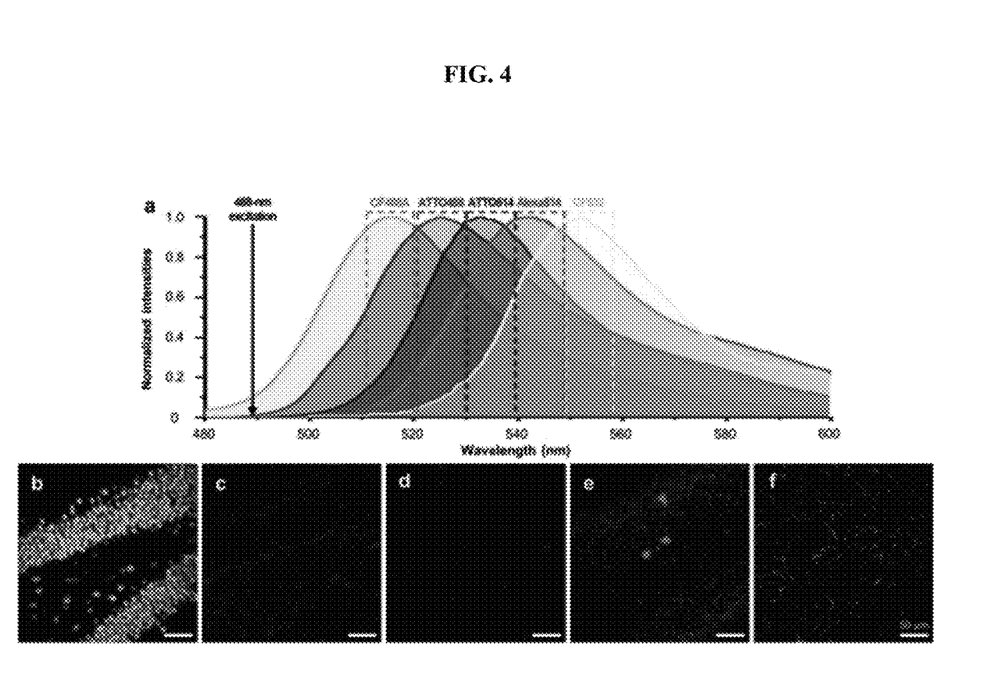
Figure 5:
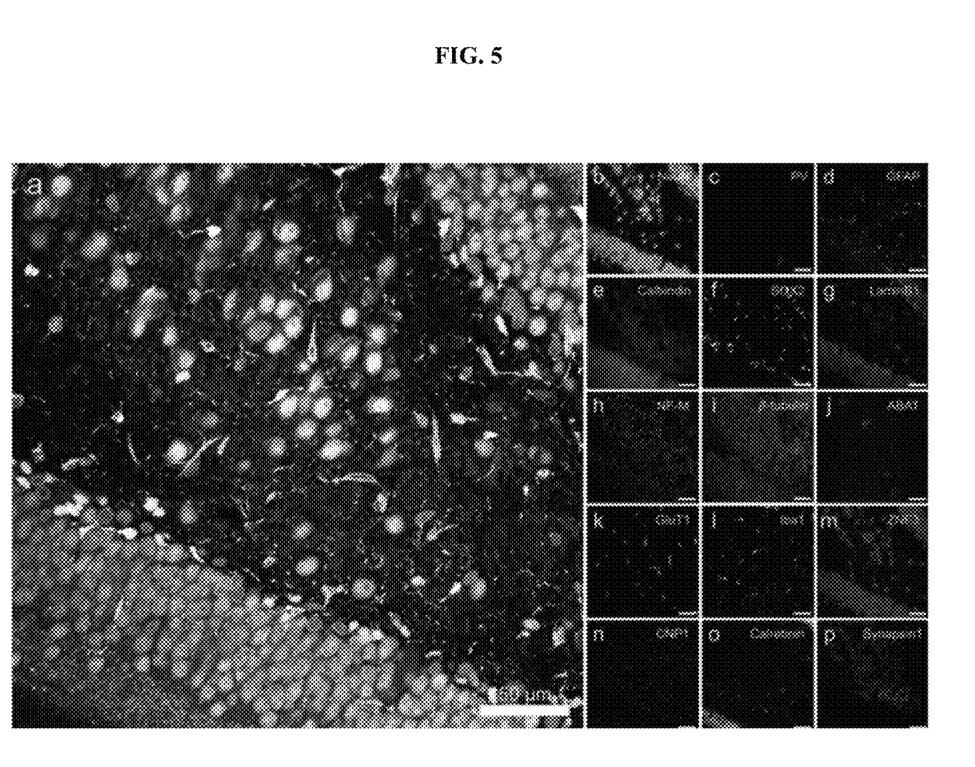
FIG. 5 illustrates images of actual application results of the electronic device according to various embodiments of the present disclosure.

FIGS. 3 and 4 are exemplary diagrams for describing operation examples of the electronic device 100 according to various embodiments of the present disclosure. In FIG. 3, (a) is a graph of an example of detection spectral ranges detected in the electronic device 100. In each detection spectral range, emission spectra of five fluorophores (CF633, Alexa647, CF660R, CF680R, and ATTO700) that can be excited by a 640 nm laser are overlapping. In this case, an interval between peaks of the emission spectra of the respective fluorophores was 20 nm or less. In FIG. 3, (b) illustrates images before and after signal unmixing. In (c) of FIG. 3, the first row shows five images (ground truth) for verification before synthesis. The second row shows synthetic images obtained by synthesizing the ground truth images based on the emission spectra of the respective fluorophores. The third row shows images on which signal unmixing was performed from the synthetic images through PICASSO v4.0 according to various embodiments. In FIG. 4, (a) is a graph of an example of detection spectral ranges detected in the electronic device 100. In each of the detection spectral ranges, emission spectra of five fluorophores (CF488A, ATTO488, ATTO514, Alexa514, and CF532) that can be excited by a 488 nm laser are overlapping. In this case, an interval between peaks of the emission spectra of the fluorophores was 10 nm or less. In FIG. 4, (b) to (f) show images on which signal unmixing was performed from an image synthesized using the same images for verification as those in the first row of FIG. 3(c). FIG. 5 illustrates images of actual application results of the electronic device 100 according to various embodiments of the present disclosure.

Referring to FIGS. 3 and 4, it was demonstrated that signal unmixing for the five types of markers was possible by using only one laser. Furthermore, it was confirmed that images on which signal unmixing was performed to the synthetic images through PICASSO v4.0 had the same pattern as images prior to the synthesis.

In addition to the five fluorophores in FIG. 3, other five fluorophores having similar spectra, but slightly different from those of the five fluorophores were selected as in [Table 1]. Furthermore, signal unmixing accuracy measurement simulations were performed on 32 ($2^5=32$) combinations based on such ten fluorophores. As a result, as in [Table 2], in all cases, a result value of Pearson coefficient correlation was measured as about 99%. This shows that signal unmixing accuracy is very high. Accordingly, according to various embodiments, it was demonstrated that PICASSO v4.0 can successfully operate on various fluorophore combinations. After the simulation verification, according to various embodiments, as illustrated in FIG. 5, simultaneous 15-color multiplexed imaging of the mouse brain slice was successfully performed through PICASSO v4.0. In FIG. 5, (a) illustrates an overlaid image of 15 protein images. (b) illustrates individual channels of 15 protein images.

TABLE 1

| Channel # | Fluorophore | Emission peak (nm) | Abbreviation |
| --- | --- | --- | --- |
| Ch1 | CF633 | 650 | CF633 |
| (645~655 nm) | Alexa Fluor 633 | 647 | AF633 |
| Ch2 | Alexa Fluor 647 | 668 | AF647 |
| (663~673 nm) | ATTO647N | 669 | AT647N |
| Ch3 | CF660R | 683 | CF660R |
| (678~688 nm) | ATTO665 | 685 | AT665 |
| Ch4 | CF680R | 701 | CF680R |
| (696~706 nm) | Alexa Fluor 680 | 702 | AF680 |
| Ch5 | ATTO 700 | 719 | AT700 |
| (714~724 nm) | Alexa Fluor 700 | 719 | AF770 |

TABLE 2

| # | Ch1 | Ch2 | Ch3 | Ch4 | Ch5 | Correlation w/GT |
| --- | --- | --- | --- | --- | --- | --- |
| 1 | CF633 | AF647 | CF660R | CF680R | AT700 | 0.990 |
| 2 | CF633 | AF647 | CF660R | CF680R | AF770 | 0.990 |
| 3 | CF633 | AF647 | CF660R | AF680 | AT700 | 0.989 |
| 4 | CF633 | AF647 | CF660R | AF680 | AF770 | 0.989 |
| 5 | CF633 | AF647 | AT665 | CF680R | AT700 | 0.990 |
| 6 | CF633 | AF647 | AT665 | CF680R | AF770 | 0.990 |

TABLE 2-continued

| # | Ch1 | Ch2 | Ch3 | Ch4 | Ch5 | Correlation w/GT |
|---|-----|-----|-----|-----|-----|------------------|
| 7  | CF633 | AF647  | AT665  | AF680  | AT700 | 0.990 |
| 8  | CF633 | AF647  | AT665  | AF680  | AF770 | 0.990 |
| 9  | CF633 | AT647N | CF660R | CF680R | AT700 | 0.991 |
| 10 | CF633 | AT947N | CF660R | CF680R | AF770 | 0.990 |
| 11 | CF633 | AT947N | CF660R | AF680  | AT700 | 0.990 |
| 12 | CF633 | AT947N | CF660R | AF680  | AF770 | 0.991 |
| 13 | CF633 | AT947N | AT665  | CF680R | AT700 | 0.990 |
| 14 | CF633 | AT947N | AT665  | CF680R | AF770 | 0.991 |
| 15 | CF633 | AT947N | AT665  | AF680  | AT700 | 0.990 |
| 16 | CF633 | AT947N | AT665  | AF680  | AF770 | 0.990 |
| 17 | AF633 | AF647  | CF660R | CF680R | AT700 | 0.989 |
| 18 | AF633 | AF647  | CF660R | CF680R | AF770 | 0.990 |
| 19 | AF633 | AF647  | CF660R | AF680  | AT700 | 0.990 |
| 20 | AF633 | AF647  | CF660R | AF680  | AF770 | 0.990 |
| 21 | AF633 | AF647  | AT665  | CF680R | AT700 | 0.990 |
| 22 | AF633 | AF647  | AT665  | CF680R | AF770 | 0.990 |
| 23 | AF633 | AF647  | AT665  | AF680  | AT700 | 0.990 |
| 24 | AF633 | AF647  | AT665  | AF680  | AF770 | 0.990 |
| 25 | AF633 | AT647N | CF660R | CF680R | AT700 | 0.990 |
| 26 | AF633 | AT947N | CF660R | CF680R | AF770 | 0.990 |
| 27 | AF633 | AT947N | CF660R | AF680  | AT700 | 0.990 |
| 28 | AF633 | AT947N | CF660R | AF680  | AF770 | 0.991 |
| 29 | AF633 | AT947N | AT665  | CF680R | AT700 | 0.991 |
| 30 | AF633 | AT947N | AT665  | CF680R | AF770 | 0.991 |
| 31 | AF633 | AT947N | AT665  | AF680  | AT700 | 0.990 |
| 32 | AF633 | AT947N | AT665  | AF680  | AF770 | 0.990 |

Figure 6:
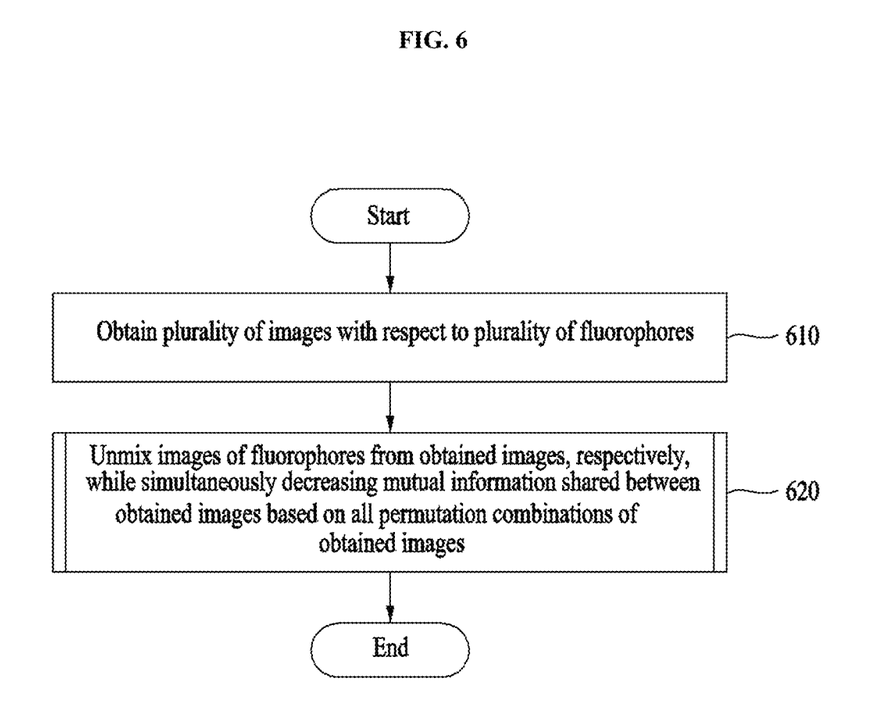
FIG. 6 is a flowchart of a method for multicolor unmixing through iterative mutual information minimization in a simultaneous channel update structure by the electronic device according to various embodiments of the present disclosure.

FIG. 6 is a flowchart of a method for multicolor unmixing through iterative mutual information minimization in a simultaneous channel update structure by the electronic device 100 according to various embodiments of the present disclosure.

Referring to FIG. 6, in step 610, the electronic device 100 may obtain a plurality of images, for example, N images with respect to a plurality of fluorophores, for example, N fluorophores labeled on different biomolecules, respectively. In this case, the processor 150 may obtain the plurality of images from different detection spectral ranges distinguished from one another, respectively. In each of the detection spectral ranges, emission spectra of at least two of the fluorophores may overlap. In this case, N may be a number equal to or greater than 2. In other words, the processor 150 may obtain two or more images of two or more fluorophores.

Next, in step 620, the electronic device 100 may unmix images of the fluorophores from the obtained images, respectively, while simultaneously minimizing mutual information shared between the obtained images based on all permutation combinations of the obtained images. In this case, the processor 150 may minimize the mutual information shared with other images of the obtained images with respect to each of the obtained images. This will be more specifically described with reference to FIG. 7.

Figure 7:
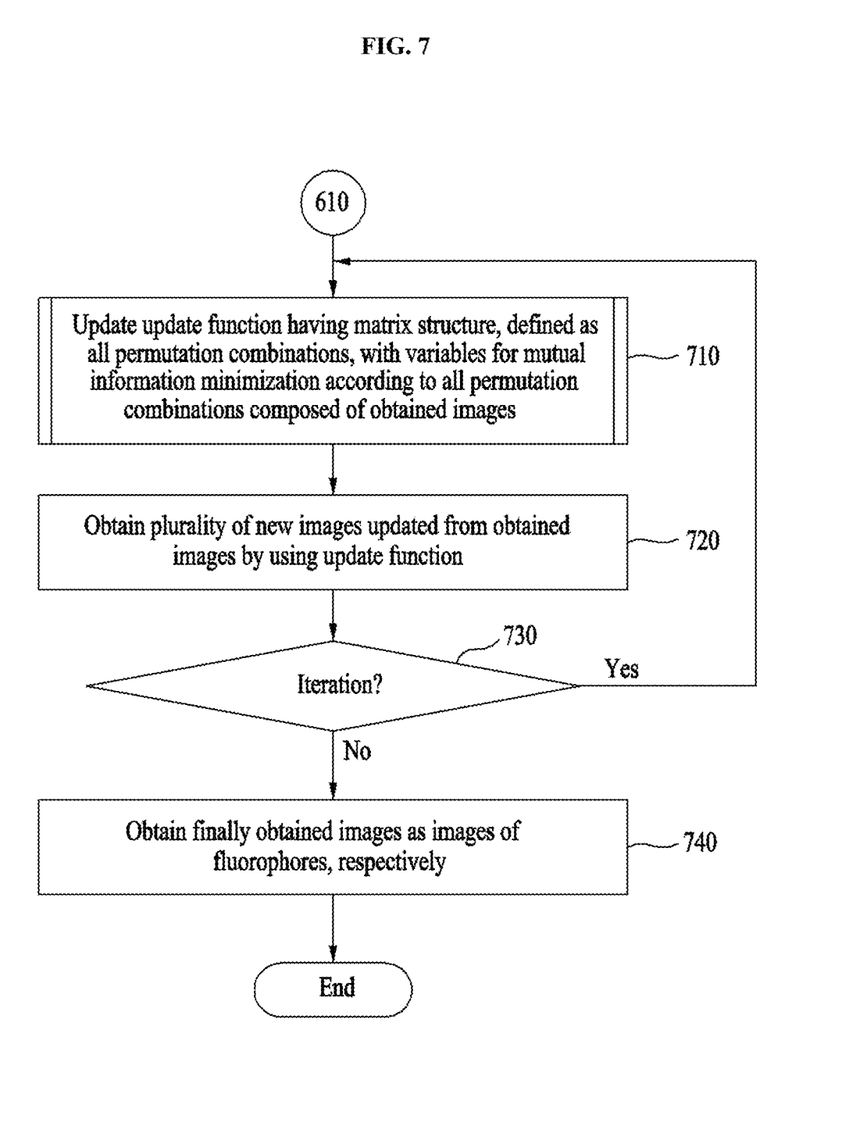
FIG. 7 is a flowchart specifically illustrating a step of unmixing images of respective fluorophores from obtained images in FIG. 6.

FIG. 7 is a flowchart specifically illustrating the step (step 620) of unmixing images of fluorophores from obtained images in FIG. 6, respectively.

Referring to FIGS. 2 and 7, in step 710, the electronic device 100 may update an update function having a matrix structure, defined as all permutation combinations, with variables for mutual information minimization according to all the permutation combinations composed of two of the obtained images. In this case, the update function may be updated by applying a variable of each permutation combination to the matrix structure. This will be more specifically described with reference to FIG. 8.

Figure 8:
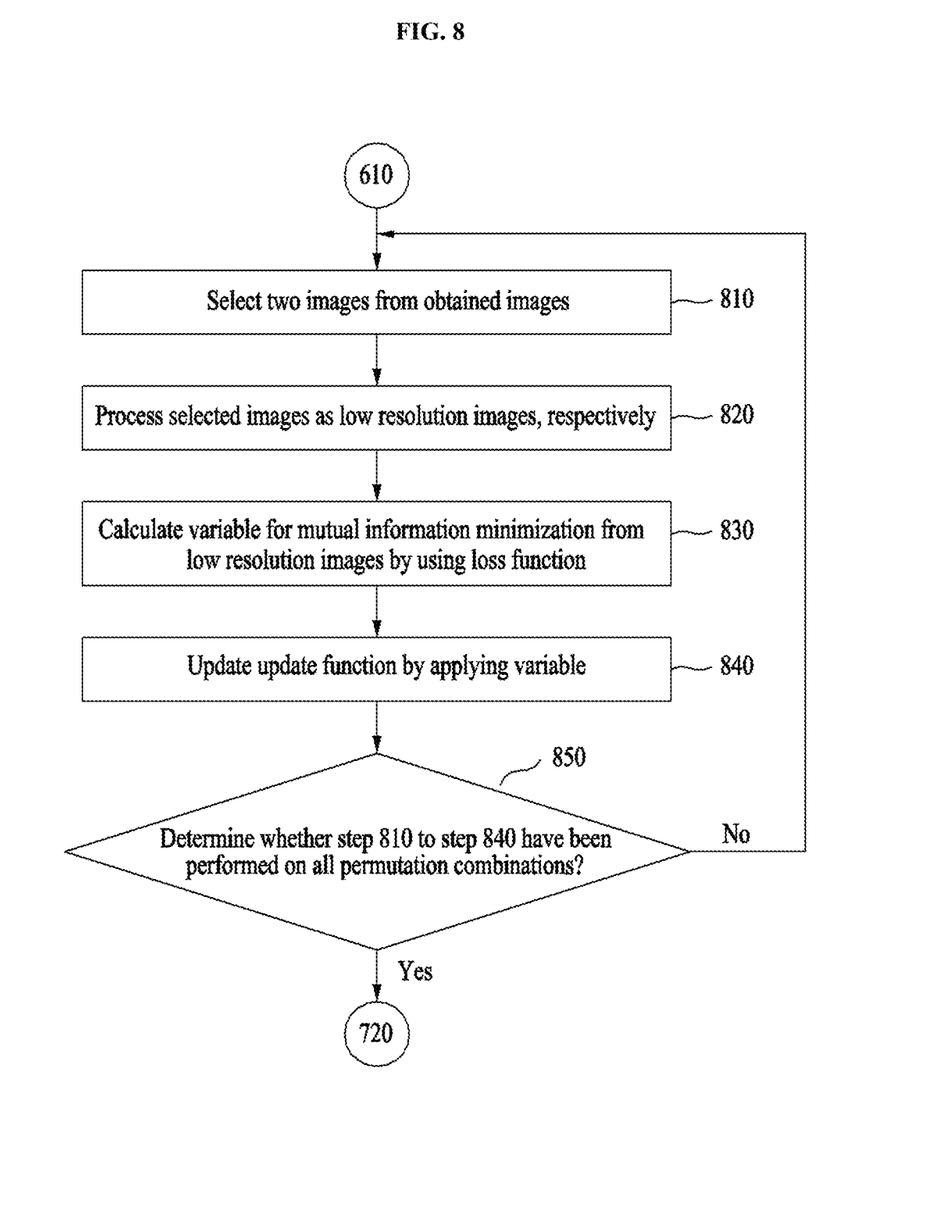
FIG. 8 is a flowchart specifically illustrating a step of updating an update function in FIG. 7.

FIG. 8 is a flowchart specifically illustrating the step (step 710) of updating an update function in FIG. 7.

Referring to FIG. 8, in step 810, the electronic device 100 may select two images from the obtained images. In this case, the processor 150 may select the two images from the obtained images based on one of all permutation combinations possible from N obtained images. Furthermore, in step 820, the electronic device 100 may process the selected images as low-resolution images, respectively. To this end, the processor 150 may down-sample and quantize the selected images. For example, the processor 150 may obtain a low-resolution image having m-times low resolution by adding (or averaging) values of adjacent m×m pixels within each of the obtained images. Accordingly, in subsequent steps, an operation speed and robustness to noise can be increased. For another example, the processor 150 may process the obtained images as the low-resolution images by setting m=1 or using another image sampling method. Accordingly, the electronic device 100 may initialize variables as in [Equation 16] below.

$$u1 = \text{IMG}_i$$

$$u2 = \text{IMG}_j$$

$$v1 = \text{pixelBinning}(u1, m)$$

$$v2 = \text{pixelBinning}(u2, m) \qquad \text{[Equation 16]}$$

wherein the u1 and the u2 may indicate the obtained images, the v1 and the v2 may indicate the low-resolution images, and the m may indicate a factor applied in order to process the obtained images as the low-resolution images, respectively.

In step 830, the electronic device 100 may calculate a variable for mutual information minimization from the low-resolution images by using a loss function. In this case, as in [Equation 17] below, the loss function may be defined. Furthermore, the processor 150 may calculate the variable from the low-resolution images as in [Equation 18] below by using the loss function.

$$L(\alpha) = I(v1; v2 - \alpha \times v1) \qquad \text{[Equation 17]}$$

$$\hat{\alpha}_{i,j} = \arg\min_{\alpha} L(\alpha) = \arg\min_{\alpha} I(v1; v2 - \alpha \times v1) \qquad \text{[Equation 18]}$$

wherein $\hat{\alpha}_{i,j}$ may indicate the variable.

In step 840, the electronic device 100 may update an update function by applying the variable. In this case, the update function may be defined as a matrix structure, such as [Equation 19] below. Furthermore, the processor 150 may apply a corresponding variable in accordance with a corresponding permutation combination in the matrix structure of the update function.

$$\begin{bmatrix} X_{1(k+1)} \\ X_{2(k+1)} \\ \vdots \\ X_{N(k+1)} \end{bmatrix} = \begin{bmatrix} 1 & -\gamma\hat{\alpha}_{1,2(k)} & \cdots & -\gamma\hat{\alpha}_{1,N(k)} \\ -\gamma\hat{\alpha}_{2,1(k)} & 1 & \ddots & \vdots \\ \vdots & \ddots & \ddots & -\gamma\hat{\alpha}_{N-1,N(k)} \\ -\gamma\hat{\alpha}_{N,1(k)} & \cdots & -\gamma\hat{\alpha}_{N,N-1(k)} & 1 \end{bmatrix} \begin{bmatrix} X_{1(k)} \\ X_{2(k)} \\ \vdots \\ X_{N(k)} \end{bmatrix} \qquad \text{[Equation 19]}$$

wherein k may indicate an iteration number, γ may indicate an update ratio, and $X_{i(k+1)}$ may indicate an i-th channel image after a k-th iteration. Furthermore, $\widehat{\alpha_{i,j}}$ may be represented by being replaced with $\alpha_{i,j}$.

In step 850, the electronic device 100 may determine whether step 810 to step 840 have been performed on all the permutation combinations. That is, the processor 150 may determine whether the update function has been updated by calculating the variable with respect to all the permutation combinations. In this case, if it is determined that step 810 to step 840 have not been performed on all the permutation combinations in step 850, the electronic device 100 may return to step 810, and may iteratively perform step 810 to step 840 based on another of all the permutation combinations. Furthermore, the electronic device 100 will iterate step 810 to step 850 until step 810 to step 840 are performed on all the permutation combinations. If it is determined that step 810 to step 840 have been performed on all the permutation combinations in step 850, the electronic device 100 may return to FIG. 7 and proceed to step 720.

Referring back to FIG. 7, in step 720, the electronic device 100 may obtain new images updated from the obtained images by using the update function. In this case, mutual information shared between the obtained images can be simultaneously minimized by the update function.

In step 730, the electronic device 100 may determine whether step 710 and step 720 will be iterated. When step 710 and step 720 are iterated, $X_i(k+1)$ obtained in a previous step is used as an input image, that is, $IMG_i$. According to an embodiment, the processor 150 may determine whether a iteration number of step 710 and step 720 has reached a predetermined number. In this case, if it is determined that the iteration number has not reached the predetermined number, the processor 150 may determine that step 710 and step 720 need to be iterated. If it is determined that the iteration number has reached the predetermined number, the processor 150 may determine that step 710 and step 720 no longer need to be iterated. According to another embodiment, the processor 150 may determine whether mutual information between the images obtained in step 720 is equal to or smaller than a reference value. In this case, if it is determined that the mutual information between the obtained images is greater than the reference value, the processor 150 may determine that step 710 and step 720 need to be iterated. If it is determined that the mutual information between the obtained images is equal to or smaller than the reference value, the processor 150 may determine that step 710 and step 720 no longer need to be iterated. If it is determined that step 710 and step 720 need to be iterated in step 730, the electronic device 100 may return to step 710 and iteratively perform step 710 to step 730.

If it is determined that step 710 and step 720 do not need to be iterated in step 730, in step 740, the electronic device 100 may finally obtain, as images of the fluorophores, the images obtained in step 720, respectively. In this case, the processor 150 may obtain the images of the respective fluorophores as the final solution, such as [Equation 20] below, by imposing positive number restrictions.

$$X_{i,k} = \max(X_{i,k}, 0) \qquad \text{[Equation 20]}$$

According to the present disclosure, image unmixing performance can be improved. In this case, in the present disclosure, signals having two or more fluorophores whose emission spectra are overlapped in one spectral range can be unmixed with higher accuracy. Specifically, in the present disclosure, images of respective fluorophores can be unmixed with higher accuracy by using only images obtained in the same number of detection spectral ranges as the number of fluorophores without measuring the emission spectrum of each of the fluorophores.

The aforementioned embodiments of the present disclosure are not implemented by only a device and method, but may be implemented through a program for realizing a function corresponding to an element according to an embodiment of the present disclosure or a recording medium on which the program has been recorded.

The embodiments of the present disclosure have been described in detail, but the scope of rights of the present disclosure is not limited thereto. Various modifications and changes using the basic concept of the present disclosure defined in the appended claims are also included in the scope of rights of the present disclosure.

The invention claimed is:

1. A method performed by an electronic device, comprising:

obtaining a plurality of images with respect to a plurality of fluorophores labeled on different biomolecules, respectively; and unmixing images of the fluorophores from the obtained images, respectively, while simultaneously minimizing mutual information shared between the obtained images based on all permutation combinations ($_NP_2$) of the obtained images;

wherein the unmixing of the images of the respective fluorophores comprises:

selecting two images of the obtained images based on one of all the permutation combinations ($_NP_2$);

updating an update function wherein updating of the update function comprises processing the selected images as low-resolution images having lower resolution than the selected images as in [Equation i] below; and $$u1 = IMG_i$$

$$u2 = IMG_j$$

$$v1 = \text{pixelBinning}(u1, m)$$

$$v2 = \text{pixelBinning}(u2, m) \qquad \text{[Equation i]}$$

wherein the u1 and the u2 indicate the obtained images, the v1 and the v2 indicate the low-resolution images, and the m indicates a factor applied in order to process the obtained images as the low-resolution images, respectively;

calculating the variable from the low-resolution images as in [Equation iii] by using a loss function defined as in [Equation ii] below; and $$L(\alpha) = I(v1; v2 - \alpha \times v1) \qquad \text{[Equation ii]}$$

$$\widehat{\alpha_{i,j}} = \arg\min_\alpha L(\alpha) = \arg\min_\alpha I(v1; v2 - \alpha \times v1) \qquad \text{[Equation iii]}$$

wherein the $\widehat{\alpha_{i,j}}$ indicates the variable;

updating the update function by applying the variable as in [Equation iv] below;

$$\begin{bmatrix} X_{1(k+1)} \\ X_{2(k+1)} \\ \vdots \\ X_{N(k+1)} \end{bmatrix} = \qquad \text{[Equation iv]}$$

$$\begin{bmatrix} 1 & -\gamma\hat{\alpha}_{1,2(k)} & \cdots & -\gamma\hat{\alpha}_{1,N(k)} \\ -\gamma\hat{\alpha}_{2,1(k)} & 1 & \ddots & \vdots \\ \vdots & \ddots & \ddots & -\gamma\hat{\alpha}_{N-1,N(k)} \\ -\gamma\hat{\alpha}_{N,1(k)} & \cdots & -\gamma\hat{\alpha}_{N,N-1(k)} & 1 \end{bmatrix}$$

$$\begin{bmatrix} X_{1(k)} \\ X_{2(k)} \\ \vdots \\ X_{N(k)} \end{bmatrix}$$

wherein the k indicates an iteration number, the γ indicates an update ratio, and the $X_{i(k+1)}$ indicates an i-th channel image after a k-th iteration; and obtaining a plurality of new images updated from the obtained images by using the update function, and $X_{i(k+1)}$ obtained in a previous step is used as an input image $IMG_i$.

2. The method of claim 1, wherein the obtaining of the plurality of images comprises obtaining the plurality of images in different detection spectral ranges distinguished from one another, respectively.

3. The method of claim 2, wherein emission spectra of at least two of the fluorophores are overlapped in each of the detection spectral ranges.

4. The method of claim 1, wherein the selecting of the two images of the obtained images and updating the update function are iterated based on all the permutation combinations ($_NP_2$), and wherein, when the iteration is completed, the obtaining the plurality of new images updated from the obtained images is performed.

5. The method of claim 1, wherein the obtaining of the plurality of new images updated from the obtained images is iterated by a predetermined number of times, and wherein, when the iteration is completed, the obtained images are obtained as the images of the fluorophores, respectively.

6. The method of claim 1, wherein the obtaining of the plurality of new images updated from the obtained images is iterated until the mutual information between the obtained images is equal to or smaller than a reference value, and wherein, when the iteration is completed, the obtained images are obtained as the images of the fluorophores, respectively.

7. The method of claim 1, wherein the images of the respective fluorophores are obtained as in [Equation v] by imposing positive number restrictions on a solution obtained through the iterative operation;

$$X_{i,k} = \max(X_{i,k}, 0) \qquad \text{[Equation v]}.$$

8. An electronic device, comprising:

a memory; and a processor connected to the memory and configured to execute at least one instruction stored in the memory, wherein the processor is configured to:

obtain a plurality of images with respect to a plurality of fluorophores labeled on different biomolecules, respectively; and unmix images of the fluorophores from the obtained images, respectively, while simultaneously minimizing mutual information shared between the obtained images based on all permutation combinations ($_NP_2$) of the obtained images;

wherein the processor is configured to:

select two images of the obtained images based on one of all the permutation combinations ($_NP_2$);

process the selected images as low resolution images having lower resolution than the selected images as in [Equation vi] below; and $u1 = IMG_i$ $u2 = IMG_j$ $v1 = \text{pixelBinning}(u1, m)$ $v2 = \text{pixelBinning}(u2, m)$      [Equation vi]

wherein the u1 and the u2 indicate the obtained images, the v1 and the v2 indicate the low resolution images, and the m indicates a factor applied in order to process the obtained images as the low resolution images, respectively;

calculate the variable from the low resolution images as in [Equation viii] by using a loss function defined as in [Equation vii] below; and $$L(\alpha) = I(v1; v2 - \alpha \times v1) \qquad \text{[Equation vii]}$$

$$\widehat{\alpha_{i,j}} = \arg\min_\alpha L(\alpha) = \arg\min_\alpha I(v1; v2 - \alpha \times v1) \qquad \text{[Equation viii]}$$

wherein the $\widehat{\alpha_{i,j}}$ indicates the variable;

updating the update function by applying the variable as in [Equation ix] below;

$$\begin{bmatrix} X_{1(k+1)} \\ X_{2(k+1)} \\ \vdots \\ X_{N(k+1)} \end{bmatrix} = \qquad \text{[Equation ix]}$$

$$\begin{bmatrix} 1 & -\gamma\hat{\alpha}_{1,2(k)} & \cdots & -\gamma\hat{\alpha}_{1,N(k)} \\ -\gamma\hat{\alpha}_{2,1(k)} & 1 & \ddots & \vdots \\ \vdots & \ddots & \ddots & -\gamma\hat{\alpha}_{N-1,N(k)} \\ -\gamma\hat{\alpha}_{N,1(k)} & \cdots & -\gamma\hat{\alpha}_{N,N-1(k)} & 1 \end{bmatrix}$$

$$\begin{bmatrix} X_{1(k)} \\ X_{2(k)} \\ \vdots \\ X_{N(k)} \end{bmatrix}$$

wherein the k indicates an iteration number, the γ indicates an update ratio, and the $X_{i(k+1)}$ indicates an i-th channel image after a k-th iteration.

9. The electronic device of claim 8, wherein the processor is configured to obtain the plurality of images in different detection spectral ranges distinguished from one another, respectively.

10. The electronic device of claim 9, wherein emission spectra of at least two of the fluorophores are overlapped in each of the detection spectral ranges.

11. The electronic device of claim 8, wherein the processor is configured to:
iteratively perform selecting two images of the obtained images and updating the update function based on all the permutation combinations, and
obtain a plurality of new images updated from the obtained images by using the update function when the iteration is completed.

12. The electronic device of claim 8, wherein the processor is configured to:
iteratively perform obtaining the plurality of new images updated from the obtained images by a predetermined number of times by using the update function, and
obtain the obtained images as the images of the fluorophores, respectively, when completing the iteration.

13. The electronic device of claim 8, wherein the processor is configured to:
iteratively perform obtaining the plurality of new images updated from the obtained images until the mutual information between the obtained images is equal to or smaller than a reference value by using the update function, and
obtain the obtained images as the images of the fluorophores, respectively, when completing the iteration.

14. The electronic device of claim 8, wherein the images of the respective fluorophores are obtained as in [Equation x] by imposing positive number restrictions on a solution obtained through the iterative operation;

$$X_{i,k} = \max(X_{i,k}, 0) \quad \text{[Equation x]}.$$

15. A non-transitory computer-readable storage medium for storing one or more programs for executing a method, the method comprising:
obtaining a plurality of images with respect to a plurality of fluorophores labeled on different biomolecules, respectively; and
unmixing images of the fluorophores from the obtained images, respectively, while simultaneously minimizing mutual information shared between the obtained images based on all permutation combinations ($_NP_2$) of the obtained images;
wherein the unmixing of the images of the respective fluorophores comprises:
selecting two images of the obtained images based on one of all the permutation combinations ($_NP_2$);
updating an update function wherein updating of the update function comprises processing the selected images as low-resolution images having lower resolution than the selected images as in [Equation i] below; and $$u1 = IMG_i$$

$$u2 = IMG_j$$

$$v1 = \text{pixelBinning}(u1, m)$$

$$v2 = \text{pixelBinning}(u2, m) \quad \text{[Equation i]}$$

wherein the u1 and the u2 indicate the obtained images, the v1 and the v2 indicate the low-resolution images, and the m indicates a factor applied in order to process the obtained images as the low-resolution images, respectively;
calculating the variable from the low-resolution images as in [Equation iii] by using a loss function defined as in [Equation ii] below; and $$L(\alpha) = I(v1; v2 - \alpha \times v1) \quad \text{[Equation ii]}$$

$$\hat{\alpha}_{i,j} = \arg\min_\alpha L(\alpha) = \arg\min_\alpha I(v1; v2 - \alpha \times v1) \quad \text{[Equation iii]}$$

wherein the $\hat{\alpha}_{i,j}$ indicates the variable;
updating the update function by applying the variable as in [Equation iv] below;

$$\begin{bmatrix} X_{1(k+1)} \\ X_{2(k+1)} \\ \vdots \\ X_{N(k+1)} \end{bmatrix} = \begin{bmatrix} 1 & -\gamma\hat{\alpha}_{1,2(k)} & \cdots & -\gamma\hat{\alpha}_{1,N(k)} \\ -\gamma\hat{\alpha}_{2,1(k)} & 1 & \ddots & \vdots \\ \vdots & \ddots & \ddots & -\gamma\hat{\alpha}_{N-1,N(k)} \\ -\gamma\hat{\alpha}_{N,1(k)} & \cdots & -\gamma\hat{\alpha}_{N,N-1(k)} & 1 \end{bmatrix} \begin{bmatrix} X_{1(k)} \\ X_{2(k)} \\ \vdots \\ X_{N(k)} \end{bmatrix} \quad \text{[Equation iv]}$$

wherein the k indicates an iteration number, the γ indicates an update ratio, and the $X_{i(k+1)}$ indicates an i-th channel image after a k-th iteration; and
obtaining a plurality of new images updated from the obtained images by using the update function, and $X_{i(k+1)}$ obtained in a previous step is used as an input image $IMG_i$.

16. The non-transitory computer-readable storage medium of claim 15, wherein the images of the respective fluorophores are obtained as in [Equation v] by imposing positive number restrictions on a solution obtained through the iterative operation;

$$X_{i,k} = \max(X_{i,k}, 0) \quad \text{[Equation v]}.$$

* * * * *